Feb. 18, 1930.  A. GUIGNARD  1,748,019
MACHINE FOR STERILIZING, WASHING, AND DRYING FRUIT
Filed May 17, 1927  3 Sheets-Sheet 1
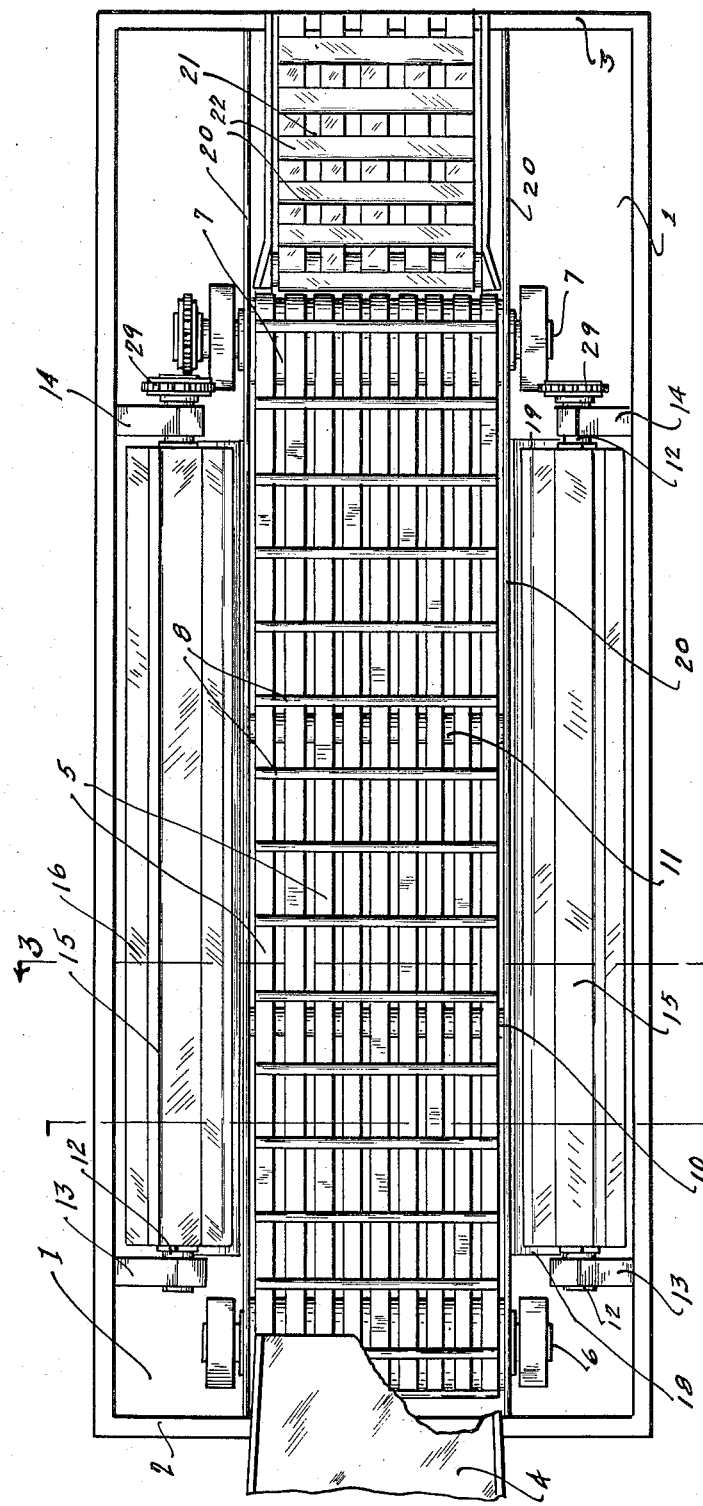
Inventor
August Guignard
Attorney

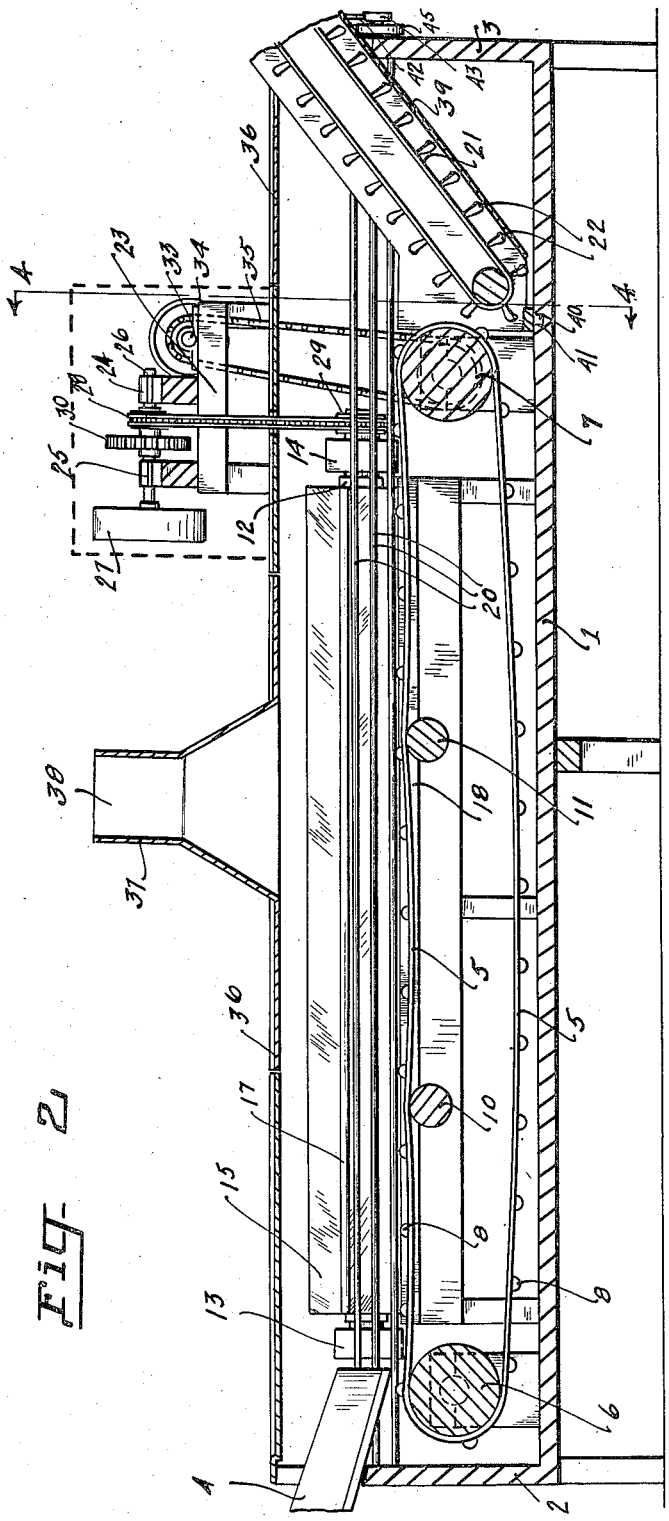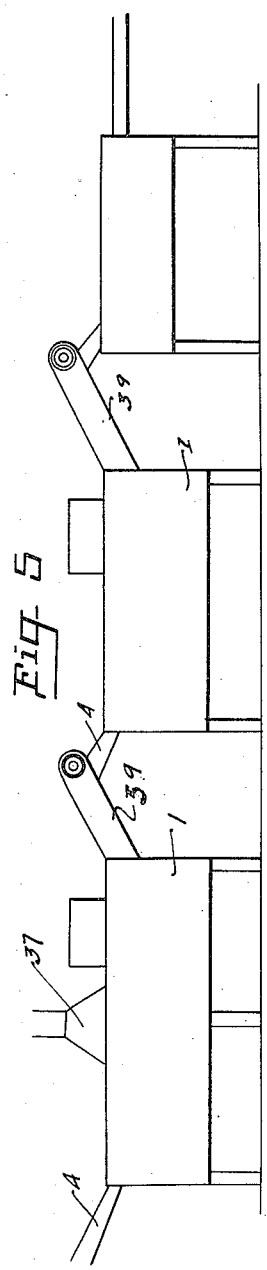

Inventor
August Guignard
Attorney
Thomas Bilyeu

Patented Feb. 18, 1930

1,748,019

UNITED STATES PATENT OFFICE

AUGUST GUIGNARD, OF HOOD RIVER, OREGON

MACHINE FOR STERILIZING, WASHING, AND DRYING FRUIT

Application filed May 17, 1927. Serial No. 192,088.

My invention relates to a machine for the processing of farm products and primarily apples and pears, that are produced and processed in commercial quantities. The object of this machine is to neutralize and otherwise remove and dissipate the spray residue left upon the fruit as it comes from the orchard and to sterilize and destroy the bacteria or other microorganisms that may be deposited upon the outer covering of the fruit or that may be developed thereupon during the storage of the same from the time the fruit is brought into the warehouse or store room until the same is to be packed out for shipment.

The department of public health of the various States, as well as of the National Government are insisting upon the removal of the spray residue or that portion thereof of arsenate of lead and other poisonous and noxious spray residues that is left upon the outer coating of the fruit, before the same is shipped. The keeping qualities of the fruit, is directly affected by the sterilization of the same by passing the fruit through a bath or the immersing or washing of the same with certain acid solutions of a diluted nature sufficiently strong to neutralize the spray residue or remove the same and to further carry out the process of sterilization by the treatment of the same in an aqueous solution of formaldehyde or other aqueous solutions containing sterilizing solution elements.

My invention consists primarily of a vat or tank, means for the continuous depositing within the tank of a flow of farm products, means being provided within the tank for receiving the stream of farm products and for carrying the same in suspension longitudinally of the tank, means being provided for the flushing of the same as it progresses along and within the tank of the treating solution. Means being provided to prevent a bruising or rubbing of the fruit surfaces by permitting the same to contact with the body portion of the tank; simple means being provided for the removal of the farm products from the tank by elevating or conveying means that will simultaneously permit the draining of the surplus treating solutions from the products. To facilitate the precipitation of the surplus fluid treating solution from the farm products, a vanner movement is imparted to the conveying and elevating mechanism.

The treating solutions will not only sterilize the bacteria and other forms of microorganisms but at the same time if permitted to dry upon the surface of the fruit would likewise be injurious to the consumers of the same and to remove and neutralize the treating solutions that may be left upon the surface of the fruit, I then pass the same across another treating tank upon which continuously fresh water is made to impinge upon and come in direct contact with the farm products to be treated; thus thoroughly and completely removing any and all liquids that may be left upon the same, before the same can then be passed on to the grading and sizing mechanism.

I have found it necessary to then pass the fruit through a drying machine. This I accomplish by dividing the fruit as the same emerges from the final washing vat into a multiple of streams running at a higher rate of longitudinal speed than that of the conveyors that carry the fruit through the processing vats, and I accomplish this result by a multiple of brushes, cylindrical in form, having bristles outwardly extending from the surface thereof that contact with and impart a brush-like action to the outer surface of the same. The fruit may then be deposited upon a grading and sizing machine and passed to the packing bins.

A further object of my invention consists in providing simple and efficient means for the continuous handling of the various fruits in commercial quantities by mechanism that will not easily get out of order, that may be cheaply constructed and that may be operated continuously over long periods without giving undue delay in its operation.

A further object of my invention consists in making the same of materials that are unaffected by acids and the other ingredients of the treating solutions and in so far as possible it is necessary to construct the same of wood or noncorrosive metals and canvas conveying belts treated with a rubber coating on the exterior of the surfaces of the same.

Still another object of my invention consists in the removal of the vapors and fumes that may be developed within the treating vats to eliminate any unhealthy working condition.

With these and incidental objects in view, the invention consists of novel features of construction and a combination of parts, the essential elements of which are set forth as hereinbefore described, with reference to the drawings which accompany and form a part of this specification.

In the drawings:

Fig. 1 is a sectional, plan view, of the primary treating tank and the associated mechanism disposed therein, the same being made with the head removed to better illustrate the mechanism disposed therein.

Fig. 2 is a longitudinal, sectional view of the primary tank, the same being taken on line 2—2 of Fig. 1, looking in the direction indicated.

Fig. 5 is a diagrammatical lay-out of the assembled unit, including the primary tank, the elevator for carrying the products therefrom and delivering the same into the secondary or washing tank and the drying mechanism for drying the products after the same has been deposited from the washing tank.

Figure 4:
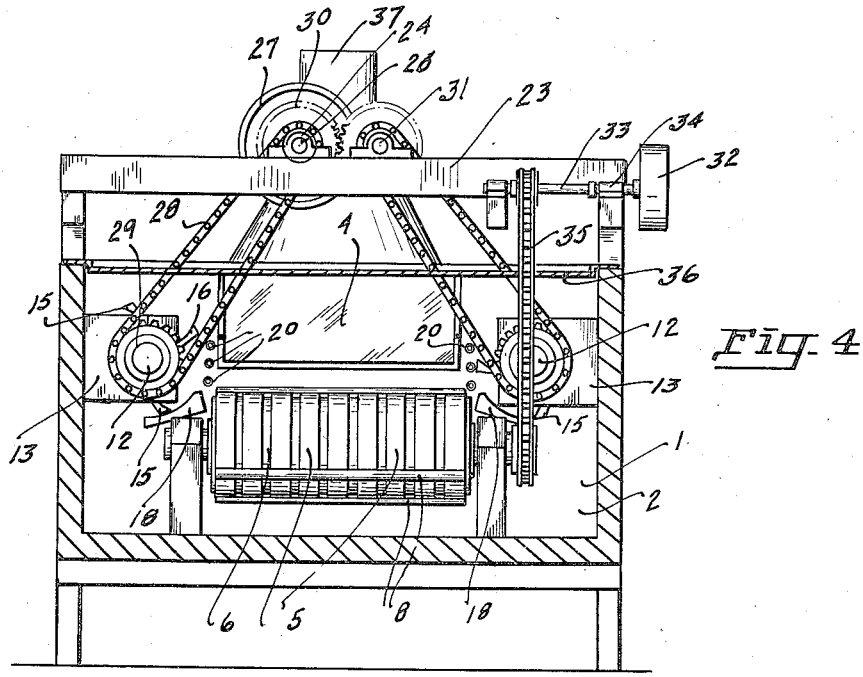
Fig. 4 is a cross section view, taken on line 4—4 of Fig. 2, looking in the direction indicated.
Figure 6:
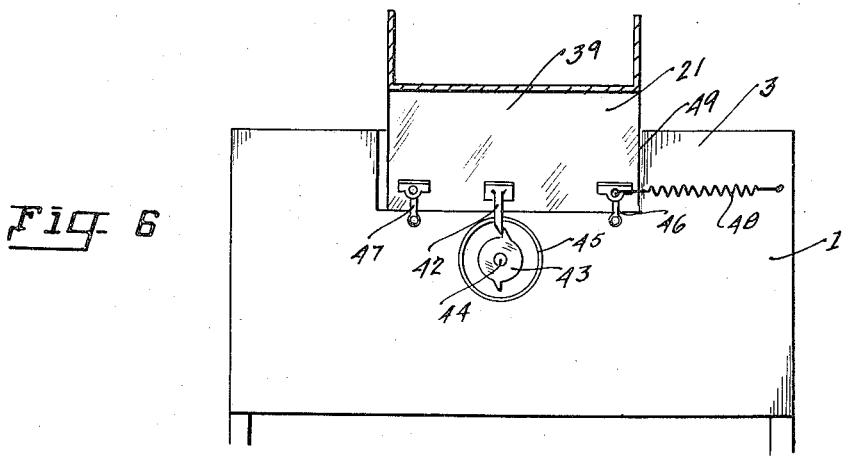
Fig. 6 is a detailed assembly view of a preferred form of embodiment for imparting a vanner movement to the elevating mechanism for carrying the farm products from the tanks to the next adjacent unit.
Figure 3:
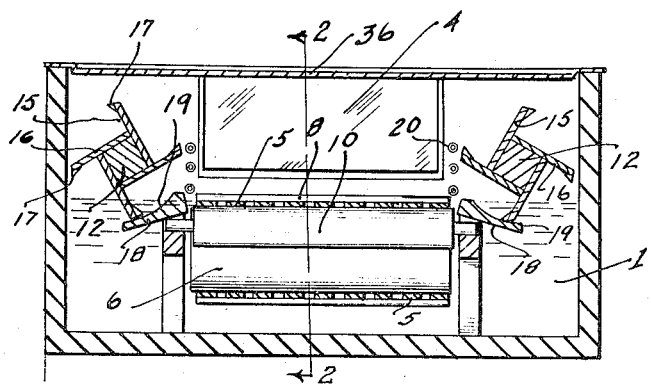
Fig. 3 is a cross section, taken on line 3—3 of Fig. 1, looking in the direction indicated.

The machine in the illustrative form of embodiment described herein, is designed especially for use in large packing houses where apples and pears are to be processed, but I do not wish to be limited in my invention to the application of the same for the processing of apples and pears as the same may be used, and satisfactory results be obtained, in the treatment of prunes, plums, oranges, lemons, peaches, and the same may be used in the treatment of certain vegetables, as tomatoes and other and like form of products.

Described in general terms, the machine consists primarily of a horizontally disposed tank 1, having end walls 2 and 3, and having side walls connecting therewith. Because of the character of elements entering into the treating solutions, it is highly desirable and almost absolutely necessary that the moving parts be made of materials that are little or unaffected by acids and other disintegrating agents comprising the essential elements used in the treating solution; for the reason, in the preferred form of embodiment,—the farm products to be treated are delivered from a sorting table into chute 4, and deposited therefrom upon a continuous endless conveyor belt 5. This conveyor belt is preferably made of a multiple of belts running about horizontally disposed end rollers 6 and 7, and having a multiple of cross bars 8 and 9, running transversely of the belts. The cross bars being in spaced relationship with each other, the same performing a dual function, first of maintaining the belts in spaced relationship and being adapted to maintain the same driving velocity to each of the belts. This series of belts and cross bars convey the products deposited upon the belts. A multiple of rollers 10 and 11, are disposed within the vat and over which the series of belts 5 pass, the same being sufficiently spaced apart to permit of a sagging of the endless conveyor belt therebetween, the object of which is to permit of a movement of the fruit stream being conveyed thereacross to permit of a complete treatment of the entire surface of the different units of farm products.

It is very essential that a constant agitation be imparted to the treating solutions as the fruit stream passes through the primary and secondary vats to impart a washing action to the outer surface of the fruit to remove the surplus spray residue and other foreign matter deposited upon the outer surface of the fruit and at the same time to disintegrate any incrustations that may be deposited thereupon.

I have found best results are obtained wherein an agitating vaned impeller is disposed longitudinally either side of the treating tank, the same being driven at sufficient velocity to carry the treating solution in substantial quantity and volume from the body portion of the treating solution and deposit the same upon the stream of farm products, being carried by the endless conveyor longitudinally of the vat. A central axle 12 preferably made of wood, runs longitudinal of the vat and is carried in wooden bearings 13 and 14, one of each disposed at either end. The vaned elements in a preferred form of embodiment, are shown at 15 and 16, having shoes 17 disposed on the outer end of the same. The vaned elements being made to run in close proximity to the curved elevating shoe 18 that is disposed submerged within the treating solution and having a concave surface 19 disposed at its upper side for its entire length, against which the outer ends of the vaned surfaces are made to contact to permit of the pick-up of the treating solutions by the vaned arms and the depositing of the same in a violent manner upon the stream flow of the farm products being treated. Side walls are formed at either side of the conveyor belt by a multiple of rubber coated bars 20, the same being in spaced relation to permit of a flowing of the treating solutions therethrough and therebetween. An elevating belt is disposed at the discharge end of the vat, to remove the farm products from the primary treating vat, the belt having a series of projections 22, made of suitable material to prevent the bruising or damaging of the surface of the farm products being handled thereby. A vanner movement is imparted to one end of this elevating mechanism to precipitate the liquids being carried upon the surface of the farm products being elevated therein. The elevator 21 deposits the farm products into the secondary treating vat having a longitudinal conveyor of like construction to that illustrated in the primary treating vat, and agitating the pumping elements run longitudinally of the vat for violently depositing cleansing fluids, as water, upon the surface of the fruit being conveyed from the secondary conveyor; the farm products are then divided into a multiple of streams. A drive stand 23 is superposed central of the vat structure 5 having bearing blocks 24 and 25 disposed thereupon with a central shaft 26, associated therewith. Power of rotation is imparted to the shaft 26 through a pulley 27 by a prime mover not here shown, but which may be supplied by any suitable mechanism as an electric motor. A driving element 28 runs the shaft 26 and a pulley or sprocket runs therefrom about a driving element 29 disposed upon the longitudinal shaft 12.

It may be found desirable to have one of these pumping impeller units disposed longitudinally at the side of the conveyor belt, though I have obtained satisfactory results by having just one of these pumping and impeller units disposed within the treating vats. Where it is found desirable to have two of these it may be to advantage to drive the same in a direction adapted to deposit the treating solution directly upon the conveyor and the products being processed. Where this is desired a gear 30 may be mounted upon the shaft 26, which is in working relationship with another gear mounted upon a shaft 31 disposed upon the stand 23. This would impel the treating solution to, or away from the conveyor in like direction at either side. The conveyor for transmitting longitudinal movement to the stream flow of farm products being treated is secured by applying a driving force to the pulley 32 from a source of power not here shown. The pulley 32 is mounted upon the shaft 33, which is supported within boxing 34 mounted upon the drive stand 23 and rotation is then imparted to the drum 7 by any suitable driving means, as a pulley 35. To prevent the dissipation of the vapors created within the tank, I have placed a removable head 36 adapted to cover the entire upper surface of the primary treating vat and an outlet head 37 is disposed thereupon, a suction, or negative atmospheric pressure is created within the vat by an exhauster being placed to withdraw any fumes or vapors created within the head through the outlet 38.

The elevator 21 is carried within the framework 39, the base of which terminates in a king pin 40 journaled within a boxing 41 disposed within a base of the tank. A downwardly extending lug 42 is disposed upon the frame work of the elevator and in registerable alignment with the cam 43 mounted upon the cam shaft 44 through a power means not here shown, which supplies power of rotation to the pulley 45. Links 46 and 47 support the elevating frame and a spring 48 normally maintains the frame against the stop 49 which may be the side wall of the end closure 3. As the shaft rotates and the cam 43 contacts with the downwardly extending lug 42 and the same is released a jarring movement is imparted to the elevator, the purpose of which is to precipitate the liquids being carried upon the surface of the products to be treated. The liquids thus liberated drain back into the tank.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In an apparatus for the purposes set forth, a tank containing a fluid including means for moving fruit through said fluid from one end of the tank to the other, a rotating shaft mounted at each side and disposed parallelly to the fruit moving means and extending substantially the full length of the fruit moving means, a plurality of outwardly projecting vanes mounted on each shaft and adapted when said shafts are rotated to agitate and shower said fluid over and about the fruit as it is being moved through said tank and guide members between the fruit moving means and the vanes for directing the showered fluid.

2. In an apparatus for the purposes set forth, a tank containing a fluid, including means for moving fruit through said fluid from one end of the tank to the other, a rotating shaft mounted at each side of and parallelly to the fruit moving means, a plurality of outwardly projecting vanes mounted to each shaft, said vanes when the aforesaid shafts are rotated, agitating and showering the fluid over and about the fruit as it is being moved in said tank, and an inclined shoe mounted below each shaft and each cooperating with the vanes upon the shaft below which it is disposed for directing the fluid onto the moving fruit.

AUGUST GUIGNARD.